US012266467B2

(12) United States Patent
Zeng et al.

(10) Patent No.: US 12,266,467 B2
(45) Date of Patent: Apr. 1, 2025

(54) SURFACE-MOUNTED TRANSFORMER AND PROCESSING METHOD THEREOF

(71) Applicant: Shenzhen Sunlord Electronics Co., Ltd., Guangdong (CN)

(72) Inventors: Deping Zeng, Guangdong (CN); Hui Lin, Guangdong (CN); Xiaohu Tang, Guangdong (CN); Qunsheng Zhou, Guangdong (CN); Wei Xie, Guangdong (CN); Yongming He, Guangdong (CN)

(73) Assignee: Shenzhen Sunlord Electronics Co., Ltd., Guangdong (CN)

( * ) Notice: Subject to any disclaimer, the term of this patent is extended or adjusted under 35 U.S.C. 154(b) by 635 days.

(21) Appl. No.: 17/527,189

(22) Filed: Nov. 16, 2021

(65) Prior Publication Data

US 2022/0172884 A1 Jun. 2, 2022

Related U.S. Application Data

(63) Continuation of application No. PCT/CN2021/098914, filed on Jun. 8, 2021.

(30) Foreign Application Priority Data

Nov. 30, 2020 (CN) ......................... 202011381405.6

(51) Int. Cl.
*H01F 27/28* (2006.01)
*H01F 1/34* (2006.01)
(Continued)

(52) U.S. Cl.
CPC ............. *H01F 27/29* (2013.01); *H01F 1/344* (2013.01); *H01F 27/255* (2013.01); *H01F 41/0246* (2013.01); *H01F 41/04* (2013.01)

(58) Field of Classification Search
CPC ........ H01F 27/29; H01F 1/344; H01F 27/255; H01F 1/37; H01F 27/022; H01F 27/2823;
(Continued)

(56) References Cited

U.S. PATENT DOCUMENTS

2016/0189840 A1 6/2016 Ahn
2017/0194085 A1 * 7/2017 Takagi .................... H01F 27/29
(Continued)

FOREIGN PATENT DOCUMENTS

CN 1484258 3/2004
CN 201717078 1/2011
(Continued)

*Primary Examiner* — Shawki S Ismail
*Assistant Examiner* — Kazi S Hossain
(74) *Attorney, Agent, or Firm* — Winston Hsu

(57) ABSTRACT

A surface-mounted transformer includes an adhesive layer and a winding product. The winding product is disposed inside the adhesive layer; the winding product includes an I-shaped magnetic core and a coil wound on a middle pillar of the I-shaped magnetic core; leading-out ends of the coil are connected to electrodes; the electrodes are exposed on the surface of the adhesive layer; and the adhesive layer is obtained through compression molding forming of a magnetic molding material. Compared with a surface-mounted transformer in the prior art, which has equal performance indexes, the surface-mounted transformer has a smaller size with a decrease proportion of over 50%; and a BOBBIN and an insulating rubber tape do not need to be used in processing. The winding product in the surface-mounted transformer is completely covered by the adhesive layer, so that the product is high in reliability and can support a PSIP plastic package environment.

5 Claims, 2 Drawing Sheets

(51) Int. Cl.

| | |
|---|---|
| ***H01F 27/255*** | (2006.01) |
| ***H01F 27/29*** | (2006.01) |
| ***H01F 41/02*** | (2006.01) |
| ***H01F 41/04*** | (2006.01) |

(58) Field of Classification Search

CPC .... H01F 27/2828; H01F 27/306; H01F 41/10; H01F 27/292; H01F 27/263; H01F 27/266

USPC ........................................... 336/84, 221, 183

See application file for complete search history.

(56) References Cited

U.S. PATENT DOCUMENTS

| | | | | |
|---|---|---|---|---|
| 2018/0001523 | A1* | 1/2018 | Huang | H01F 17/04 |
| 2019/0237234 | A1* | 8/2019 | Tei | H01F 27/263 |
| 2020/0373063 | A1* | 11/2020 | Yoshinaka | H01F 27/2804 |
| 2021/0142938 | A1* | 5/2021 | Matsuura | H01F 19/04 |
| 2021/0183558 | A1* | 6/2021 | Park | H01F 27/32 |

FOREIGN PATENT DOCUMENTS

| | | | |
|---|---|---|---|
| CN | 102856037 | | 1/2013 |
| CN | 205028753 | U | 2/2016 |
| CN | 106158245 | | 11/2016 |
| CN | 107275045 | A | 10/2017 |
| CN | 107863233 | A | 3/2018 |
| CN | 109559876 | A | 4/2019 |
| CN | 111524691 | | 8/2020 |
| CN | 112562972 | | 3/2021 |
| JP | 2000-40623 | A | 2/2000 |
| JP | 2001-319816 | A | 11/2001 |

* cited by examiner

SURFACE-MOUNTED TRANSFORMER AND PROCESSING METHOD THEREOF

CROSS REFERENCE TO RELATED APPLICATIONS

The present application is a continuation application of PCT Patent Application No. PCT/CN2021/098914 filed on 2021 Jun. 8, which claims priority to Chinese Patent Application No. 202011381405.6, filed on 2020 Nov. 30. The contents of the above-mentioned application are all hereby incorporated by reference.

BACKGROUND OF THE INVENTION

1. Field of the Invention

The present application relates to the field of switching power supply modules, and more particularly relates to a surface-mounted transformer and a processing method thereof.

2. Description of the Prior Art

Currently, the traditional auxiliary power transformers such as winding transformers cannot be adapted to a plastic package environment due to limitations in a magnetic core assembly structure thereof, so that cracking takes place easily and finally electric performance changes and use requirements cannot be met. In addition, the traditional winding transformers are large in size and difficult in miniaturization. Nowadays, modularization is a dominant trend for modern electronic information technologies; power modules are continuously increased; and switching power supplies are developing to lightness, smallness, thinness, high reliability, high stability, high frequency and high efficiency. Therefore, higher requirements are proposed for auxiliary power transformers. Inevitably, products must be light, small, thin and highly reliable. Thus, it is urgent to solve various defects in the prior art so as to satisfy demands.

Disclosure of the above background art is only for facilitating understanding of invention concepts and technical solutions of the present application and may not always belong to the prior art of the present application. If there is no evidence showing that above contents have been disclosed before the application date of the present application, the above background art should not be used to assess novelty and inventiveness of the present application.

SUMMARY OF THE INVENTION

As found in research by the inventor of the present invention, a transformer magnetic core of a traditional winding transformer is prone to electric performance deterioration under plastic package. As found in further research, it is caused by cracking of the transformer magnetic core. Causes leading to cracking of the transformer magnetic core are not only correlated to repeated sudden changes of temperature of the winding transformer, but also related to result design of the traditional winding transformer.

In order to overcome defects in the prior art as mentioned above, the present invention provides a surface-mounted transformer which comprises an adhesive layer and a winding product, wherein the winding product is disposed inside the adhesive layer; the winding product comprises an I-shaped magnetic core and a coil wound on a middle pillar of the I-shaped magnetic core; leading-out ends of the coil are connected to electrodes; the electrodes are exposed on the surface of the adhesive layer; and the adhesive layer is obtained through compression molding forming of a magnetic molding material.

The present invention may further adopt the following optional solutions:

The magnetic molding material is made by mixing of Ni—Zn ferrite powder and a thermosetting epoxy molding material.

In a mixture of the Ni—Zn ferrite powder and the thermosetting epoxy molding material, a weight percentage of the Ni—Zn ferrite powder is 20%-90%.

The coil is of a 3-layer structure and comprises 4 windings; and electrodes Ag—Ni—Sn 3-layer structural electrodes, the number of the electrodes is 8, and the electrodes are connected to free ends of the 4 windings respectively.

A distance between an electrode surface and the adhesive layer is not smaller than 0.04 mm.

The leading-out ends of the coil are led out in a right-angle manner.

The leading-out ends of the coil are welded and fixed by hot pressing.

The adhesive layer is cuboid-shaped as a whole; the electrodes are exposed on a surface of the adhesive layer; and other surfaces of the adhesive layer are smooth surfaces.

The present invention further provides a processing method of a surface-mounted transformer, which is used for processing any of the above surface-mounted transformers and comprises the following steps:

- hanging lead starting ends on electrodes and conducting welding and fixation by hot pressing;
- winding, wherein a coil is wound on a middle pillar of an I-shaped magnetic core;
- hanging lead finishing ends on the electrodes and conducting welding and fixation by hot pressing to obtain a winding product;
- molding pressing and solidifying forming, wherein a magnetic molding material is injected into a mold cavity in which the winding product is stored for mold pressing, and solidifying forming is carried out; and
- finally, demolding.

Optionally, the processing method further comprises: pasting a layer of high-temperature-resistant adhesive paper on a bottom surface of a mold Carrier plate (carrying plate) before the step of molding pressing and solidifying forming, and then putting the winding product in a cavity of the Carrier plate; making the electrodes of the winding product in contact with the high-temperature-resistant adhesive paper, and then installing the Carrier plate on a mold; and putting a material cake made of the magnetic molding material into a feeding room and then conducting die assembly and compression molding forming. A process of the compression molding forming comprises: making the material cake made of the magnetic molding material form a viscous state at a set temperature at first and then flow at a set filling pressure till the cavity of the Carrier plate is full of the magnetic molding material, and then carrying out solidifying forming at a set solidification temperature and a set solidification pressure.

Compared with the prior art, the present invention at least comprises the following beneficial effects:

an overall plastic package structure is adopted, so that compared with a surface-mounted transformer of a non-plastic package structure in the prior art, which has equal performance indexes, the surface-mounted transformer of the present invention has a smaller size with a decrease proportion of over 50%; and a BOBBIN and an insulating rubber tape do not need to be used in processing.

In addition, the magnetic molding material is made by mixing of the Ni—Zn ferrite powder and the thermosetting epoxy molding material. The difference between a CTE (coefficient of thermal expansion) of the molding material and a CTE of the magnetic core is small, so that a problem of cracking and separation caused by repeated temperature impacts can be solved and thus the product can support over 5 times of reflow soldering and machinability and an applicable scope of the product are greatly improved.

These and other objectives of the present invention will no doubt become obvious to those of ordinary skill in the art after reading the following detailed description of the preferred embodiment that is illustrated in the various figures and drawings.

DETAILED DESCRIPTION

Preferable embodiments of the present invention will be further described below in detail in conjunction with FIG. 1 to FIG. 4.

A surface-mounted transformer of the present invention is mainly applied to an auxiliary power module and used as a flyback transformer in a secondary power supply. It is an auxiliary power transformer with a small size, low leakage inductance and high reliability, which can support PSIP (Power Supply in Package) plastic package.

Descriptions/definitions of relevant technical terms: High-temperature-resistant adhesive paper: also called as a high-temperature-resistant adhesive tape, namely an adhesive tape used in a high-temperature operation environment with a resistant temperature of 120-260 DEG C.

Embodiment 1

Figure 1:
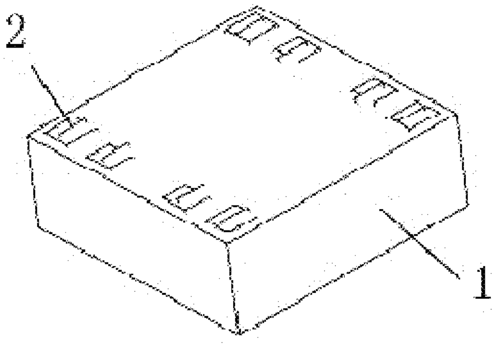
FIG. 1 is a schematic diagram of a surface-mounted transformer product of a plastic package structure according to an embodiment of the present invention.

As shown in FIG. 1, a surface-mounted transformer adopts a plastic package structure and comprises an adhesive layer 1 and a winding product, wherein the winding product is disposed inside the adhesive layer and completely coated; and the winding product comprises an I-shaped magnetic core and a coil wound on a middle pillar of the I-shaped magnetic core.

Leading-out ends of the coil are connected to electrodes 2; and the electrodes 2 are exposed on the surface of the adhesive layer 1. The adhesive layer 1 is obtained through compression molding forming of a magnetic molding material; the adhesive layer 1 is cuboid-shaped as a whole; the electrodes 2 are exposed on a surface of the adhesive layer 1; and other surfaces of the adhesive layer 1 are smooth surfaces.

The overall plastic package structure is adopted, so that compared with a surface-mounted transformer in the prior art, which has equal performance indexes, the surface-mounted transformer of the present invention has a smaller size with a decrease proportion of over 50%; and a BOBBIN and an insulating rubber tape do not need to be used in processing.

Embodiment 2

Based on the above embodiment 1, the present embodiment adopts a preferable related technical means to achieve better technical effects. Detailed descriptions are made below in conjunction with specific structures of related products, as follows:

The magnetic molding material is made by mixing of Ni—Zn ferrite powder and a thermosetting epoxy molding material. Preferably, in a mixture of the Ni—Zn ferrite powder and the thermosetting epoxy molding material, a weight percentage of the Ni—Zn ferrite powder is 20%-90%.

Figure 2:
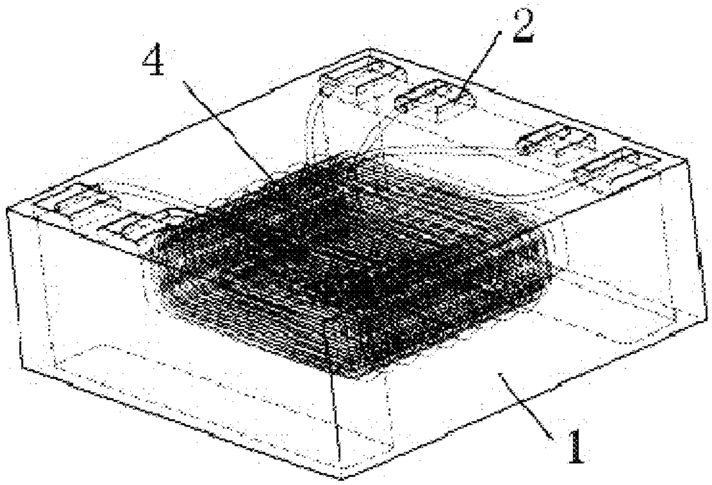
FIG. 2 is a structural perspective diagram of the product in FIG. 1.
Figure 3:
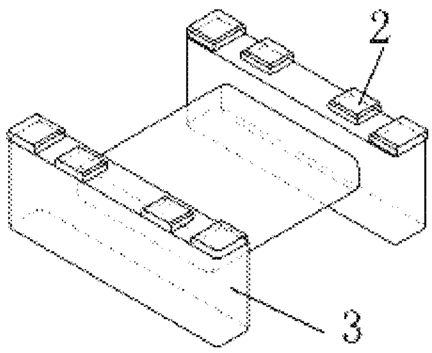
FIG. 3 is a structural schematic diagram of an I-shaped magnetic core according to an embodiment.
Figure 4:
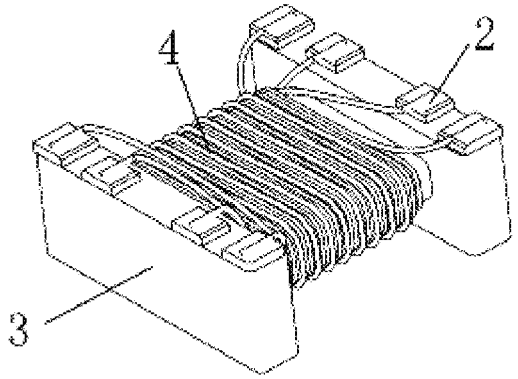
FIG. 4 is a schematic diagram of assembly of a coil and an I-shaped magnetic core according to an embodiment.

As shown in FIG. 2 to FIG. 4, the winding product comprises an I-shaped magnetic core 3 and a coil 4 wound on a middle pillar of the I-shaped magnetic core 3. The coil 3 is of a 3-layer structure and comprises 4 windings; and electrodes 2 are Ag—Ni—Sn 3-layer structural electrodes, the number of the electrodes is 8, and the electrodes are connected to free ends of the 4 windings respectively.

A distance between an electrode surface of the electrode 2 and the surface of the adhesive layer 1 is not smaller than 0.04 mm. In subsequent surface-mounting processing, there is good contact between the protruded electrodes and soldering tin, and surface mounting reliability is high.

The leading-out ends of the coil of the electrodes 2 are led out in a right-angle manner (connecting lines relative to 4 electrodes on a same side) and are welded and fixed by hot pressing. The leading-out ends of the coil are led out in the right-angle manner, so that safe distances between the windings can increase easily and effectively and thus a short-circuit risk of the product can be reduced.

Embodiment 3

The present embodiment provides a processing method used for processing a surface-mounted transformer of a plastic package structure, which comprises the following steps:

Lead starting ends are hung on electrodes and welding and fixation are conducted by hot pressing.

Winding is conducted, wherein a coil is wound on an I-shaped magnetic core. For example, enameled copper wires (namely the coil) are at first wound on the I-shaped magnetic core, wherein there are two windings on a primary side and a secondary side respectively, and there are four winding in total. During winding, the two enameled copper wires are in two-wire duplex winding and constitute a primary winding and a secondary winding. Then, in the same manner, a single enameled copper wire is used to constitute another primary winding and another secondary winding respectively. After completion of winding of designated circles, lead finishing ends are also hung on the electrodes and welded and fixed by hot pressing to finally form a winding product. Preferably, leading-out ends of the coil are led out in a right-angle manner relative to connecting lines of 4 electrodes on a same side and are welded and fixed by hot pressing.

Molding pressing and solidifying forming are conducted, wherein a magnetic molding material is injected into a mold cavity in which the winding product is stored for mold pressing, and solidifying forming is carried out. For example, during injection molding of the winding product after winding, a layer of high-temperature-resistant adhesive paper is pasted on a bottom surface of a mold Carrier plate, and then the winding product is put in a cavity of the Carrier plate; during placement, electrode surfaces of the winding product in contact with the high-temperature-resistant adhesive paper; then the Carrier plate full of the winding product is installed on a fixed position of a mold; and meanwhile, a customized magnetic molding material cake is put into a feeding room and then die assembly and compression molding forming are carried out. In compression molding forming, the magnetic molding material cake forms a viscous state at a high temperature at first and then flows at a certain high pressure to fill the cavity of the Carrier plate in which the winding product is stored; and then solidifying forming is carried out at a maintained pressure and a high temperature, and a single piece of plastic package product is formed after demolding.

The magnetic molding material is made by mixing of Ni—Zn ferrite powder and a thermosetting epoxy molding material. Preferably, a weight percentage of the Ni—Zn ferrite powder is 20%-90%.

Preferably, during compression molding forming, the material cake of the magnetic molding material forms a viscous state at a high temperature of 150° C.-200° C. at first and then flows at a high pressure of 10 MPa-30 MPa to fill the cavity in which the winding product is stored. Then, solidifying forming is carried out for 200-300 s at a maintained pressure and a high temperature of 150° C.-200° C. Finally, an adhesive layer coating structure is formed around the winding product.

It can be found through comparison of the structure of the above novel surface-mounted transformer of the plastic package structure provided by the present invention and the structure of a traditional winding transformer: the novel surface-mounted transformer of the plastic package structure is small in product size and volume and does not need to use a BOBBIN (thread reel, winding reel) and an insulating rubber tape; and corresponding size design can be made according to needs for product use environments, so that size flexibility is high. Compared with a transformer of an assembled structure, which has equal performance indexes, the structure can reduce the height by over 50% and reduce the volume by over 50%. A winding framework and the coil in the surface-mounted transformer are coated and filled by a magnetic adhesive, so that product reliability is high and a PSIP plastic package environment can be supported. As for the traditional transformer, the winding product is not filled with a molding material peripherally, so that when the transformer is used in a plastic package environment, the environmental molding material will fill peripheries of the winding product. The environmental molding material and the magnetic core are greatly different in a CTE, so that a cracking phenomenon of the magnetic core cannot be avoided when the environmental temperature suffers repeated sudden changes.

Above contents are further detailed descriptions made for the present invention in conjunction with specific preferable implementations and do not mean that specific implementation of the present invention is only limited to these descriptions. For those skilled in the art of the present invention, several equivalent substitutions or obvious modifications can be made without departing from concepts of the present invention, with equal performance or usages, and shall be deemed to fall into the protection scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A surface-mounted transformer, comprising an adhesive layer and a winding product, wherein the winding product is disposed inside the adhesive layer; the winding product comprises an I-shaped magnetic core and a coil wound on a middle pillar of the I-shaped magnetic core;

leading-out ends of the coil are connected to electrodes; the electrodes are exposed on the surface of the adhesive layer;

the adhesive layer is obtained through compression molding forming of a magnetic molding material, wherein the magnetic molding material is made by mixing of Ni—Zn ferrite powder and a thermosetting epoxy molding material, wherein in a mixture of the Ni—Zn ferrite powder and the thermosetting epoxy molding material, a weight percentage of the Ni—Zn ferrite powder is 20%-90%; and the electrodes are Ag—Ni—Sn 3-layer structural electrodes, the number of the electrodes is 8, and the electrodes are connected to free ends of the 4 windings respectively; and the leading-out ends of the coil connected to the electrodes are led out in a right-angle manner.

2. The surface-mounted transformer according to claim 1, wherein the coil is of a 3-layer structure and comprises 4 windings.

3. The surface-mounted transformer according to claim 2, wherein a distance between an electrode surface and the adhesive layer is not smaller than 0.04 mm.

4. The surface-mounted transformer according to claim 3, wherein the leading-out ends of the coil are welded and fixed by hot pressing.

5. The surface-mounted transformer according to claim 1, wherein the adhesive layer is cuboid-shaped as a whole; the electrodes are exposed on a surface of the adhesive layer; and other surfaces of the adhesive layer are smooth surfaces.

* * * * *